Figure 4:
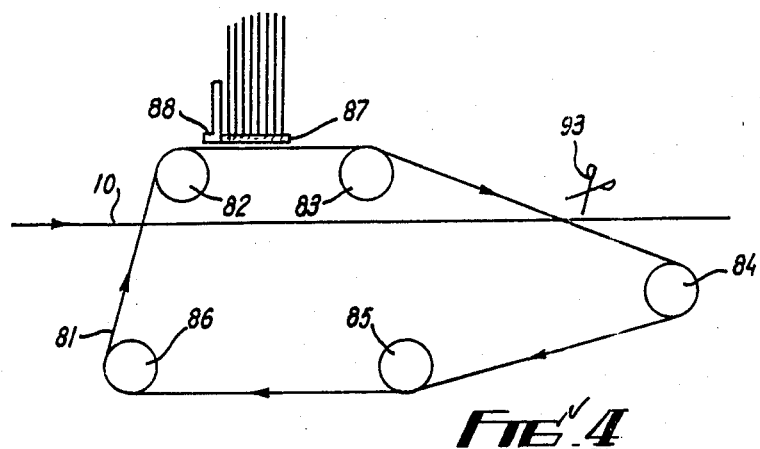

United States Patent [19]

Britton

[11] Patent Number: 4,883,551

[45] Date of Patent: Nov. 28, 1989

[54] MANUFACTURE OF FLEXIBLE SHEET MATERIAL

[75] Inventor: Arthur Britton, High Eldwick, nr Bingley, England

[73] Assignee: Courtaulds PLC, London, England

[21] Appl. No.: 54,057

[22] Filed: May 26, 1987

Related U.S. Application Data

[63] Continuation of Ser. No. 699,850, Feb. 8, 1985, abandoned.

[30] Foreign Application Priority Data

Feb. 10, 1984 [GB] United Kingdom ................ 8403622

[51] Int. Cl.⁴ ........................... B32B 5/08; B32B 5/02
[52] U.S. Cl. .................................... 156/178; 156/177; 156/181; 156/436; 156/440; 264/212; 264/216; 264/271.1
[58] Field of Search ............... 156/181, 177, 441, 440, 156/439, 436, 437, 178, 324; 264/261, 216, 212, 271.1, 136, 177

[56] References Cited

U.S. PATENT DOCUMENTS

| | | | |
|---|---|---|---|
| 1,674,772 | 6/1928 | Frank | 156/437 |
| 2,456,923 | 12/1948 | Cogovan et al. | 156/178 |
| 2,671,745 | 3/1954 | Slayter | 156/177 |
| 2,732,885 | 1/1956 | Vander Hoven | 156/440 |
| 3,321,348 | 5/1967 | Rupp | 156/177 |
| 3,508,990 | 4/1970 | Marzocchi | 156/437 |
| 3,783,068 | 1/1974 | Brown | 156/174 |

FOREIGN PATENT DOCUMENTS 1170468 1/1959 France .............................. 156/440

Primary Examiner—Michael W. Ball
Assistant Examiner—Jeff H. Aftergut
Attorney, Agent, or Firm—Fleit, Jacobson, Cohn, Price, Holman & Stern

[57] ABSTRACT

A plurality of strands is introduced by a reciprocating weft laying device into a layer of paste-like bonding material deposited on the upper surface of an endless belt. A plurality of warp strands extending in the warp direction is introduced into the paste over the first mentioned strands. A second plurality of strands in the weft direction is similarly introduced by means of a second reciprocating weft laying device and a second plurality of strands in the warp direction is introduced over these second weft strands. The paste-like bonding material is then cured by a heated roller to produce the finished material. Material may be made having only one set of warp strands and one set of weft strands or more than two sets each of warp and weft strands.

14 Claims, 3 Drawing Sheets

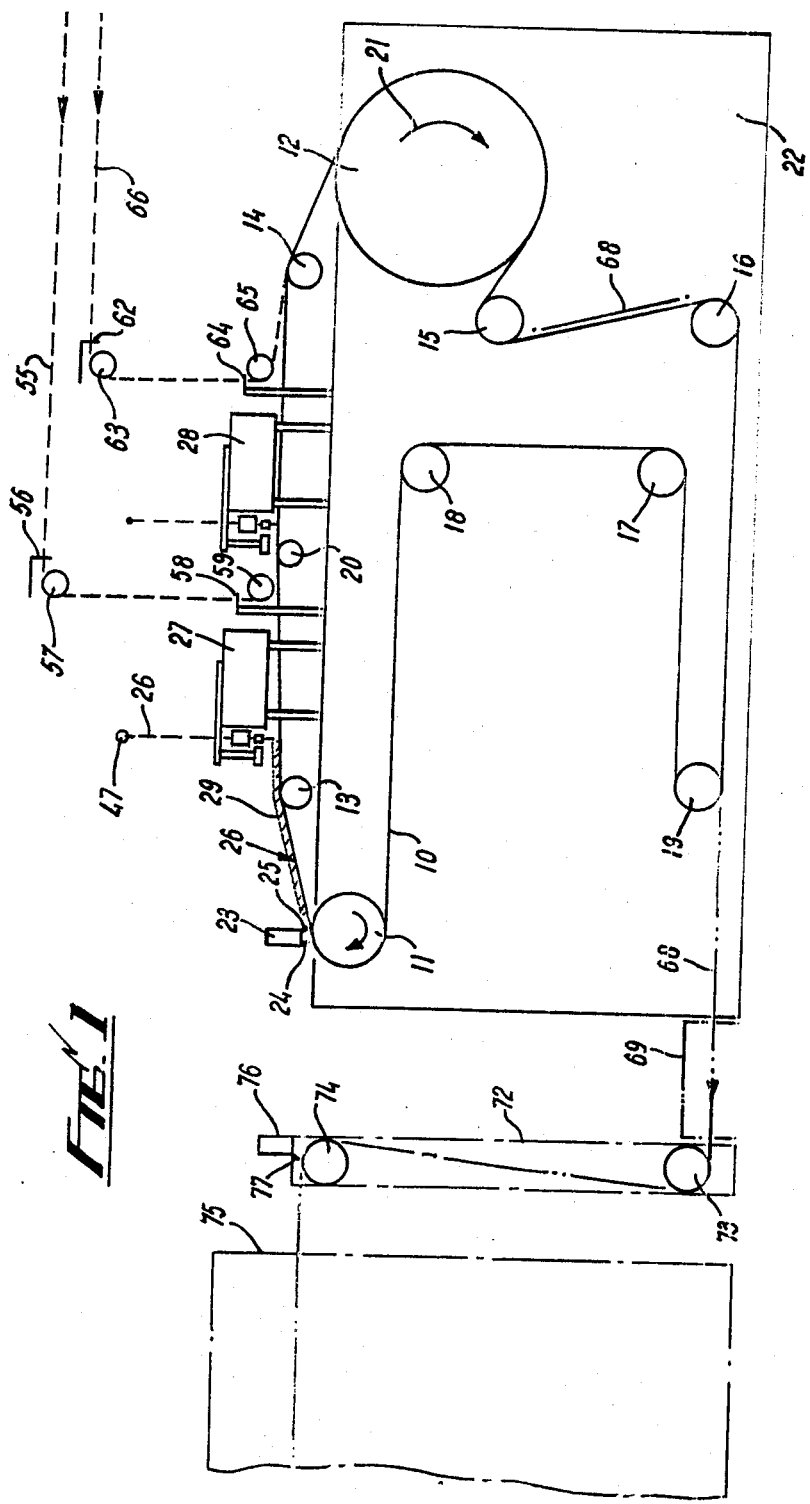

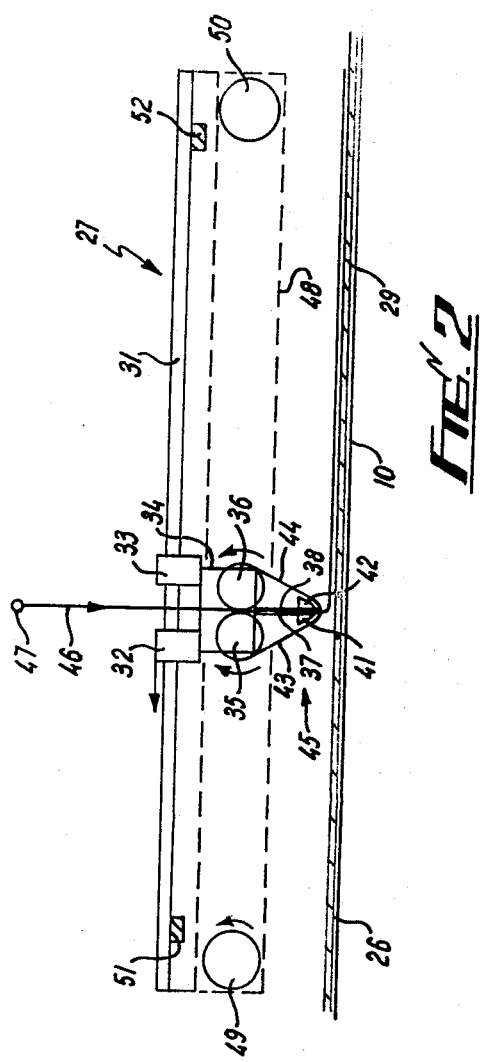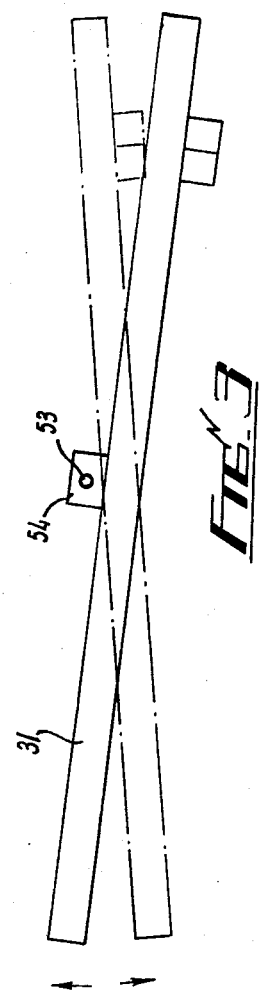

MANUFACTURE OF FLEXIBLE SHEET MATERIAL

This application is a continuation of application Ser. No. 699,850, filed Feb. 8, 1985, now abandoned.

This invention relates to the manufacture of reinforced flexible sheet material which may be employed in the same end uses as tarpaulin, for example in covering loads on lorries, or as a fabric for inflatable structures, or as a robust wrapping material.

Reinforced flexible sheet material has been made by coating a woven textile fabric with a plastics material in a procedure involving supplying plastics material directly onto the surface of the fabric. The present invention enables a reinforced flexible sheet material to be manufactured without the expense of first weaving a fabric to serve as the reinforcement.

According to the present invention, a method of manufacturing reinforced sheet material comprises the steps of forming a layer of bonding material in a paste-like condition on a supporting surface, laying strands so that they traverse the layer of bonding material, constraining the strands to enter the layer of paste-like bonding material so that the bonding material surrounds the strands, and treating the bonding material to form it into a flexible sheet material.

According to a further aspect of the present invention, a method of manufacturing a reinforced sheet material comprises the steps of forming a layer of bonding material in a paste-like condition on a supporting surface, laying aligned or substantially aligned strands so that they traverse the layer of bonding material, constraining the strands to enter the layer of paste-like bonding material so that the bonding material surrounds the strands and treating the bonding material to form it into flexible sheet material.

The method may further include the steps of laying further aligned or substantially aligned strands on the first mentioned strands in a direction transverse to the first mentioned strands and constraining the further strands to enter the layer of paste-like bonding material so that the bonding material surrounds the further strands as well as the first mentioned strands prior to treating the bonding material as described above.

The first mentioned strands or the further strands may be laid as successive sets of strands, or, the first mentioned strands or the further strands may be laid as a single set of strands. The further strands may be tensioned so that they hold the first mentioned strands trapped between themselves and said supporting surface. The further strands may be arranged to press the first mentioned strands into the bonding material, and, if desired, to press them against the supporting surface.

The strands may comprise spun yarns or continuous filaments or a mixture of these and the continuous filaments may be of flat, round or approximately round construction. The strands may be of textile or other material.

In the case of a thermoplastic bonding material, the treatment of the bonding material to form it into a flexible sheet material may involve allowing or causing the bonding material to cool.

The invention includes a machine for manufacturing a reinforced flexible sheet material comprising means for forming a layer of bonding material in a past-like condition on a supporting surface, means for laying strands so that they traverse the layer of bonding material, means for constraining the strands to enter a layer of bonding material in a paste-like condition on the supporting surface so that the bonding material surrounds the strands, and means for treating the bonding material to form it into flexible sheet material.

The invention also includes reinforced flexible sheet material when made by the machine or process of the invention.

Figure 5:
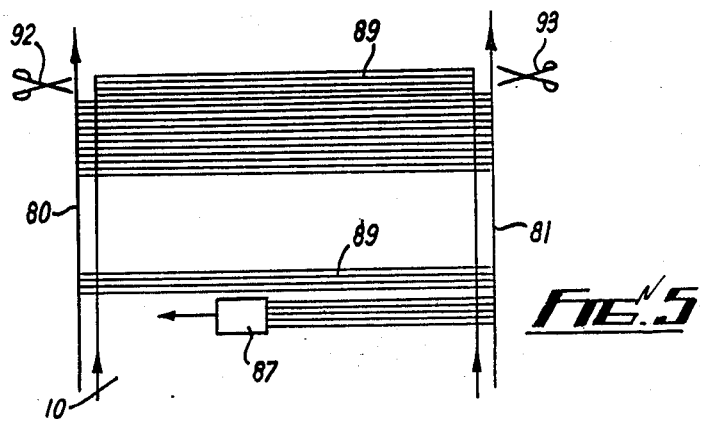
Figure 6:

The invention will be further described, by way of example, with reference to the accompanying diagrammatic drawings in which:

FIG. 1 is a side view of a machine according to the invention; for carrying out the method of the invention, FIG. 2 is an elevation (on a larger scale) of a device for laying strands in the weft-direction in the machine of FIG. 1, FIG. 3 is a plan showing part of the device of FIG. 2, FIG. 4 is a side elevation of another device for laying strands in the weft-direction in a machine similar to that of FIG. 1, FIG. 5 is a plan showing part of the device of FIG. 4, and FIG. 6 is a diagram illustrating the motion of one component of the device of FIG. 4.

The machine shown in FIG. 1 comprises an endless belt 10 arranged to run over a front roller 11, a heated roller 12, a cooled roller 15 and guide rollers 16, 17 and 18 and a tension roller 19 spring mounted by means (not shown). A further roller 20 causes the upper reach of the belt 10 to rise slightly from roller 13 to roller 20. The heated roller 12 is arranged to be driven in the direction of the arrow 21 to draw the belt 10 in the direction from the front roller 11 over the guide rollers 13 and 14 to the heated roller 12. The rollers are mounted in a frame indicated generally at 22.

A trough 23 is mounted to extend across the endless belt 10 above the front roller 11 and is open at its lower edge with downwardly extending lips 24 and 25 which come close to the upper surface 26 of the belt 10, the lip 25 serving as a doctor blade for bonding material to be deposited on the belt 10. Means, not shown, supply bonding material in a paste-like condition to the trough 23 from which it is deposited evenly (under the control of the lip 25) on the upper surface 26 of the belt 10 which constitutes a supporting surface for the layer 29 of bonding material thus formed. The belt 10 carries the layer 29 of bonding material forward over the rollers 13 and 14 and beneath successive and identical weft laying devices 27 and 28.

The weft laying device 27 comprises a rail 31 on which are mounted two blocks 32 and 33. The blocks 32 and 33 carry a frame 34 on which are mounted two drive rollers 35 and 36 and two downwardly depending parallel plates 37 and 38. At the lower edge of the plate 37 is mounted a wedge-shaped guide 41 and at the lower edge of the plate 38 is mounted a wedge-shaped guide 42. An endless drive belt 43 extends partly around the roller 35, over the plate 37, curves round the lower edge of the plate 37 and extends back up to the roller 35 over the guide 41. An endless drive belt 44 is carried in a similar way by the roller 36, the plate 38 and the guide 42.

The assembly of blocks 32 and 33 with the frame 34 and the parts carried on them constitutes a weft carriage 45 for laying spaced-apart aligned or substantially aligned strands on the upper surface 26 of the belt 10 so that the strands traverse the layer of bonding material 29 in directions lying cross-wise to the direction of movement of the belt 10. To achieve the laying of strands in the bonding material 29, a strand 46 is guided from a creel, not shown, to an eyelet guide 47 mounted on the weft carriage 45 and from thence proceeds down between the endless belts 43 and 44 which grip it and drive it downwardly onto the layer 29 of paste-like bonding material on the belt 10 so that it traverses the bonding material in the direction from side to side of the belt.

The weft carriage 45 is moved to-and-fro cross-wise of and above the belt 10 on the rail 31 by means of a continuous chain 48 carried by pulleys 49 and 50 mounted on the rail 31, the pulley 49 being driven in an anti-clockwise direction in FIG. 2 by an electric motor, not shown, also mounted on the rail 31. A clamp, not shown secured to the continuous chain 48 is mounted for sliding movement up-and-down on a bar, not shown, secured to the weft carriage 45 allowing the clamp to move with the chain 48 as it moves around the pulleys and thus move the weft carriage to-and-fro across the belt 10.

To drive the drive rollers 35 and 36, each is mounted on to a separate shaft, not shown, and on each shaft are mounted two sprag clutches, not shown, each associated with a sprocket, not shown. An indented belt is mounted to extend lengthwise of the rail 31 above the sprockets to mesh with one of the sprockets on each shaft and another indented belt is similarly mounted below the sprockets to mesh with the other sprocket on each shaft. As the weft carriage 45 moves to-and-fro, the sprockets in mesh with the shafts are constrained to rotate, the sprockets in mesh with the upper indented belt rotating in an opposite direction to the sprockets in mesh with the lower indented belt. The direction of rotation of all the sprockets changes when the direction of to-and-fro movement of the weft carriage 45 changes but the action of the sprag clutches is chosen so that the roller 35 is always driven in a clockwise direction and the roller 36 is always driven in an anti-clock-wise direction whatever the direction of movement of the weft carriage 45.

The weft carriage 45 thus moves to-and-fro across the belt 10 and feeds down onto the belt successive weft-direction strands 46. In order to lay all the weft-direction strands 46 so that they are at least substantially aligned with one another, the rail 31 is pivoted about axle 53 extending upward from a bracket 54, FIG. 3, not shown in FIG. 1 or 2. A drive mechanism, not shown, operated by limit switches 51 and 52 triggered by the weft carriage 45 at the opposite ends of its stroke swings the rail 31 through a small angle as shown in FIG. 3 at the end of each stroke of the weft carriage 45 across the belt 10, in readiness for the movement of the weft carriage 45 in the opposite direction across the belt. The angle through which the rail 31 is rotated at the end of each stroke of the weft carriage 45 is chosen according to the speed of the belt 10 to achieve substantial alignment of weft-direction strands and to place them substantially at right angles to the direction of movement of the belt.

The second weft laying device 28 is arranged behind the weft, laying, device 27 in relation to the direction of movement of the upper reach of the belt 10 and is constructed and functions in an identical manner.

Between the weft laying devices 27 and 28 a set of warp-direction strands 55 are led down onto the belt 10. The strands 55 are supplied from a creel, not shown, and pass through a set of reeds 56, over a guide bar 57, down towards the belt 10, through another set of reeds 58 and over a roller 59 spaced from the belt 10 onto layer 29 of the bonding material on the belt 10 so that they traverse the layer 29 of bonding material in the longitudinal direction of the belt 10 that is transverse to the direction of the weft-direction strands 46.

Because of frictional resistance to the movement of the strands 55 along their supply route, the strands are laid under a sufficient degree of tension onto the belt 10 so that the strands 55 press down on the weft-direction strands pushing them into the layer 29 of paste-like bonding material and holding them against the belt 10. Because of the location of the roller 59 in close proximity to the belt 10 and the fact that the belt 10 is inclined slightly upward between roller 11 and roller 20, the warp-direction strands are also constrained to descend quickly into the layer 29 of paste-like bonding material in advance of the weft laying device 28.

Behind the weft laying device 28 are located a set of reeds 62, a guide bar 63, a set of reeds 64 and a roller 65 to guide a second set of warp-direction strands onto the layer 29 of bonding material and the belt 10. The strands 66 press into the layer 29 of bonding material weft-direction strands 67 laid onto the layer 29 by the weft laying device 28 and because of the frictional resistance to movement of the strands 66 along their supply route, the proximity of the roller 65 to the belt 10 and the change of direction of the belt 10 around the roller 14, the strands 66 are under a sufficient degree of tension and are constrained to hold the weft-direction strands 67 against the belt 10 and themselves to enter the layer 29 of paste-like bonding material.

The belt 10 thus proceeds from the guide roller 14 to the heated roller 12 carrying the layer 29 of bonding material which surrounds two sets of weft-direction strands 46 and 67 and two sets of warp-direction strands 55 and 66. The viscosity of the paste-like bonding material is so chosen that it can flow well enough to surround completely the strands introduced into it but will maintain itself as a coherent layer 29 on the belt 10. The term paste-like should be interpreted in the specification having regard to those requirements. When the layer 29 is carried over the heated roller 12, curing of the paste-like bonding material takes place and the layer 29 leaves the roller 12 substantially cured in the form of a flexible reinforced sheet material 68. Contact with the cooled roller 15 cools the sheet material 68 and it separates from the belt 10 at the guide roller 19. Thence it passes underneath an operating platform 69, on which operatives may stand to gain access to the machine, and is guided upward by rollers 73 and 74 mounted on a stanchion 72 and enters an oven 75 where it may be heated to complete the curing process, if necessary, or to soften it prior to embossing with a desired pattern by embossing rollers, not shown.

A trough 76 with doctor blade 77 is disposed at the top of the stanchion 72 for application of a finish to a surface of the sheet material 68, if desired. The trough may also be used to apply a further layer of the bonding material to the surface of the sheet material 68 before embossing. Curing of the further layer of bonding material will be initiated in the oven 75.

Instead of laying a single weft-direction strand 46 or 67 onto the belt 10, each weft laying device 27 or 28 may be adapted to lay a set of weft-direction strands onto the belt 10. The same incidence of weft-direction strands in the sheet material 68 can then be achieved at a higher rate of production.

An alternative device for laying weft-direction strands on the belt 10 is illustrated in FIGS. 4, 5 and 6. The device, which is of conventional construction, comprises a pair of conveyor chains 80 and 81 each mounted on a separate set of guide wheels 82, 83, 84, 85 and 86 and located outside the opposite edges of the belt 10. The guide wheels 84 are driven, by means, not shown, so that the conveyor chains 80 and 81 move together in the direction shown by the arrows in FIG. 4. The conveyor chains 80 and 81 carry hooks, not shown, which project upwardly from the upper reaches of the conveyor chains in FIG. 4 and serve to hold weft-direction strands for introduction onto the belt 10. A weft carriage 87, supplied with weft-direction strands 89 from a creel, not shown, is arranged to move to-and-fro above the belt 10 on a guide rail 88 which is pivotally mounted and is rotated on its pivot in synchronism with to-and-fro movements of the weft carriage 87 so that the motion of the weft carriage 87 is as shown in FIG. 6. The linear speed of the weft carriage 87 and the pivoting movement of the guide rail 88 are so arranged that the weft-direction strands are laid between the conveyor chains 80 and 81 at right angles to the direction of movement of the conveyor chains, and thus at right angles to the direction of movement of the belt 10.

The weft carriage 87 shown in FIGS. 4 to 6 is arranged to lay simultaneously eight weft-direction strands 89 between the conveyor chains 80 and 81 so that the strands are held by the hooks (not shown) on the conveyor chains and are carried forward and downward towards the belt 10.

Located one at each side of the belt 10 at positions just in advance of the location where the paths of the conveyor chains 80 and 81 descend below the path of the belt 10 are two strand cutting devices 92 and 93 indicated schematically in FIGS. 4 and 5. The cutting devices sever the loops of the weft direction strands adjacent the edges of the belt 10 allowing individual weft-direction strand elements to be laid on the layer 29 of bonding material on the belt 10 as the paths of the conveyor chains descend below the belt 10 as shown in FIG. 4.

When using weft laying devices as shown in FIGS. 4, 5 and 6, the spacing of the guides for the warp-direction strands and the path of the belt 10 may be different from that illustrated in FIG. 1 in order to accomodate the weft laying devices in the machine.

Instead of introducing two sets of weft-direction strands and two sets of warp-direction strands into the flexible sheet material as described above, one set of weft-direction and one set of warp-direction strands only may be introduced. Alternatively, using a suitably adapted machine, more than two sets of weft-direction and more than two sets of warp-direction strands may be introduced. As a further alternative, warp-direction or weft-direction strands only may be introduced into the layer 29. Further, the strands may be laid down so as to traverse the layer 29 in directions which are not aligned in the warp or weft-direction and the strands may be out of alignment with one another and/or may, for example, be layed down in a sinuous or a sinuous and overlapping configuration.

If it is desired to ensure that the strands are pressed into the bonding material, a further roller may be arranged in nip relation with the roller 14 or the heated roller 12 in FIG. 1 in order to effect this and this is especially desirable if strands are laid down not under tension and not constrained by the geometrical configuration of the belt 10 to enter the layer 29 of bonding material. At such a pair of nip rollers, the reinforced layer 29 of bonding material may be laminated to another sheet, for example, a layer of foam rubber introduced to pass through the nip with the layer 29 of bonding material.

Warp-direction strands may be laid in advance of weft-direction strands. If a weft laying device is used which can maintain the weft-direction yarns under tension, the weft-direction yarns can be constrained to enter the paste-like bonding material by virtue of that tension and can be arranged to press into the bonding material any previously laid warp-direction strands. A weft laying device such as that shown in FIGS. 4, 5 and 6 can be arranged to maintain weft-direction strands under tension over the relevant period, for example by locating the cutting devices after the position where the strands have entered the bonding material.

The bonding material may comprise polyvinyl chloride in which case the transformation to a flexible sheet effected by the heated roller 12 and, if used, the oven 75 completes the process of gelation.

The strands may comprise textile yarns made from spun staple fibre or continuous filaments or mixtures of these. Other strands which may be used include continuous polypropylene tapes and continuous filaments of carbon fibre. Steel strands may be introduced to make a highly conductive sheet material. Suitable continuous filament textile strands comprise multi-filament nylon yarn. Suitable bonding materials other than polyvinyl chloride include natural or synthetic rubber and polyurethane.

A suitable thickness of flexible sheet material containing four sets of reinforcing strands is typically in the region of 0.05 cm and a suitable weight would be in the region of 500 g/sqm. A typical suitable end count for weft-direction and warp-direction reinforcing strands would be in the region of 3 ends/cm in each set of strands.

The path of the belt 10 in the apparatus of FIG. 1 may be arranged differently from the path shown in that Figure to bring the layer 29 of bonding material into direct contact with the heated roller 12 so that the layer 29 is sandwiched between the belt 10 and the roller 12. This promotes more rapid heating (and curing where applicable) of the bonding material.

I claim:

1. A method of manufacturing reinforced sheet material for conveying purposes by incorporating strands in a binding material, said method comprising the steps of: providing a supply of a settable bonding material comprising a natural or synthetic resin in a flowable paste-like condition above a moving supporting surface, causing material from the supply to flow onto the supporting surface so as to form a coherent layer of bonding material on the surface, which layer is such that it will flow well enough to allow entry into it of the strands and will have sufficient material to encompass the strands completely; laying strands so that they traverse the layer of bonding material; driving the strands into the layer of bonding material before the material sets so that the bonding material surrounds the strands; and treating the bonding material to form it into a solid, flexible sheet material having the strands embedded therein.

2. A method as claimed in claim 1, wherein the step of treating the bonding material to form it into a solid, flexible sheet material involves allowing or causing the bonding material to cool.

3. A method as claimed in claim 1 wherein said strand laying step further includes laying a plurality of substantially parallel, spaced strands in a transverse direction substantially perpendicular to a longitudinal axis of the sheet.

4. A method of manufacturing reinforced sheet material for covering purposes by incorporating strands in a bonding material, said method comprising the steps of: forming a coherent layer of a settable bonding material comprising a natural of synthetic resin in a paste-like condition on a supporting surface, which layer is such that it will flow well enough to allow entry into it of the strands and will have sufficient material to encompass the strands completely; laying aligned or substantially aligned strands so that they traverse the layer of bonding material; driving the strands into the layer of bonding material before the material sets so that the material surrounds the strands, and treating the bonding material to form it into a solid, flexible sheet material having the strands embedded therein.

5. A method as claimed in claim 4 including the steps of laying further aligned or substantially aligned strands on the first mentioned strands in a direction transverse to the first mentioned strands and constraining the further strands to enter the layer of bonding material prior to treating the bonding material.

6. A method as claimed in claim 5, wherein the first mentioned strands are laid as successive sets of strands.

7. A method as claimed in claim 5, wherein the number of said further strands is substantially 3 strands per cm.

8. A method as claimed in claim 5, wherein said supporting surface is an endless belt and the method includes the steps of constraining the endless belt to change its direction of movement in a region where strands are laid thereon and to present in said region a convex surface carrying said layer of bonding material, and guiding at least said first-mentioned strands or said further strands to said layer on said convex surface.

9. A method as claimed in claim 5, wherein the further strands are tensioned so that they hold the first mentioned strands trapped between themselves and said supporting surface.

10. A method as claimed in claim 9, wherein the further strands are arranged to press the first mentioned strands into the bonding material.

11. A method as claimed in claim 5, wherein the first mentioned strands or the further strands are laid as a single set of strands or as successive sets of strands.

12. A method as claimed in claim 11, wherein the further strands are laid as a single set of strands.

13. A method as claimed in claim 11, wherein the further strands are laid as successive sets of strands.

14. A method as claimed in claim 4, wherein the number of strands is substantially 3 strands per cm.

* * * * *